United States Patent
Koch et al.

(10) Patent No.: US 9,978,356 B2
(45) Date of Patent: May 22, 2018

(54) SYSTEM AND METHOD FOR ACTIVELY INFLUENCING SOUND

(71) Applicant: Eberspächer Exhaust Technology GmbH & Co. KG, Neunkirchen (DE)

(72) Inventors: Viktor Koch, Plochingen (DE); Federico Buganza, Esslingen (DE)

(73) Assignee: Eberspächer Exhaust Technology GmbH & Co. KG, Neunkirchen (DE)

(*) Notice: Subject to any disclaimer, the term of this patent is extended or adjusted under 35 U.S.C. 154(b) by 0 days. days.

(21) Appl. No.: 15/479,874

(22) Filed: Apr. 5, 2017

(65) Prior Publication Data

US 2017/0294181 A1 Oct. 12, 2017

(30) Foreign Application Priority Data

Apr. 6, 2016 (DE) .................. 10 2016 106 325
Apr. 6, 2016 (DE) .................. 10 2016 106 326

(51) Int. Cl.
*G10K 11/178* (2006.01)
*G06F 3/16* (2006.01)

(52) U.S. Cl.
CPC .......... *G10K 11/1782* (2013.01); *G06F 3/165* (2013.01); *G10K 2210/12822* (2013.01); *G10K 2210/3025* (2013.01); *G10K 2210/3026* (2013.01); *G10K 2210/3044* (2013.01); *G10K 2210/30232* (2013.01)

(58) Field of Classification Search
CPC ......... G10K 2210/12822; G10K 11/22; G10K 11/175; G10K 2210/3026; G10K 2210/51; G10K 11/1782; G10K 11/1788; G10K 11/178
See application file for complete search history.

(56) References Cited

U.S. PATENT DOCUMENTS

2005/0024134 A1  2/2005 Bolz et al.
2005/0207585 A1  9/2005 Christoph
(Continued)

OTHER PUBLICATIONS

Kuo S Met Al: "Active Noise Control: A Tutorial Review", Proceedings of the IEEE, IEEE. New York, US, Bd. 87, Nr. 6, Jun. 1, 1999 (Jun. 1, 1999), Seiten 943-973, XP011044219.
(Continued)

*Primary Examiner* — Mohammad Islam
(74) *Attorney, Agent, or Firm* — McGlew and Tuttle, P.C.

(57) ABSTRACT

A system includes a sound generator (20) that generates sound superimposed to sound to be manipulated. An error sensor (50) measures superimposed sound and outputs a corresponding feedback signal (e'(n)). A signal generator (91) generates a sound signal (y(n)). A controller (92) generates a control signal (λ(n)) representing a value of a sequence of rational numbers. A weighter (93) weights the generated sound signal (y(n)) with the control signal (λ(n)) and inverts it. An adder (94) adds the weighted/inverted sound signal to the feedback signal (e'(n)) and outputs a modified feedback signal (e(n)) to the signal generator (91). A weighter (95) weights the generated sound signal (y(n)) with the difference from one and with the control signal (λ(n)) and outputs the sound signal y'(n). The generated sound signal (y(n)) is a function of the modified feedback signal (e(n)).

18 Claims, 7 Drawing Sheets

(56) References Cited

U.S. PATENT DOCUMENTS

| | | | | |
|---|---|---|---|---|
| 2013/0013147 A1* | 1/2013 | Luecking | ................ | F01N 1/065 |
| | | | | 701/36 |
| 2013/0142352 A1* | 6/2013 | Koch | ....................... | H04R 1/22 |
| | | | | 381/86 |
| 2014/0321659 A1* | 10/2014 | Buganza | ................. | F01N 1/065 |
| | | | | 381/71.4 |
| 2014/0376733 A1* | 12/2014 | Pommerer | ............. | H04R 3/002 |
| | | | | 381/71.4 |
| 2015/0060192 A1* | 3/2015 | Wink | ...................... | F01N 13/08 |
| | | | | 181/245 |
| 2015/0230012 A1* | 8/2015 | Schadler | .................. | H04R 1/02 |
| | | | | 381/86 |

OTHER PUBLICATIONS

Liang Wang and Woon-Seng Gan, "Convergence Analysis of Narrowband Active Noise Equalizer System under Imperfect Secondary Path Estimation", IEEE Transactions on Audio, Speech, and Language Processing, vol. 17, Issue 4, May 2009, pp. 1-7.

\* cited by examiner

SYSTEM AND METHOD FOR ACTIVELY INFLUENCING SOUND

CROSS REFERENCE TO RELATED APPLICATIONS

This application claims the benefit of priority under 35 U.S.C. § 119 of German Applications 10 2016 106 325.8, filed Apr. 6, 2016, and 10 2016 106 326.6, filed Apr. 6, 2016 and International Application PCT/EP2016/076248, filed Oct. 31, 2016, the entire contents of which are incorporated herein by reference.

FIELD OF THE INVENTION

The present invention pertains to a system and to a method for actively influencing sound. The sound to be influenced may be carried, for example, in an exhaust system or an intake system of an internal combustion engine of a vehicle. The internal combustion engine now represents the noise source of the sound to be influenced.

BACKGROUND OF THE INVENTION

Exhaust systems for internal combustion engines are conventionally built of components through which exhaust gas flows, on the whole, in all operating situations and together form the exhaust system. These components may be, in addition to one or more line sections, for example, one or more turbo chargers, one or more catalytic converters and/or one or more mufflers. Air correspondingly flows through exhaust systems for internal combustion engines in all operating situations and exhaust systems usually have one or more filters, valves and compressors.

Exhaust systems and intake systems have recently been started to be complemented by systems for actively influencing noise carried in the exhaust system or intake system, which can be attributed to the operation of an internal combustion engine. Such systems superimpose the noise, which is being carried in the exhaust system or intake system and is generated essentially by the internal combustion engine, with artificially generated sound waves, which muffle the noise being carried in the exhaust system or intake system. As a result, a sound released to the outside of the exhaust system or intake system shall fit the image of a particular manufacturer, appeal to customers and comply with legally required limit values.

This is achieved by at least one sound generator being provided, which is in fluidic connection with the exhaust system or intake system and thus radiates sound into the interior of the exhaust system or intake system. This artificially generated sound and the sound generated by the internal combustion engine are superimposed to one another and leave the exhaust system or the intake system together. Such systems may also be used for muffling. To achieve a complete destructive interference of the waves of the noise being carried in the exhaust system or intake system and of the sound generated by the sound generator, the sound waves originating from the loudspeaker must correspond in terms of amplitude and frequency to the sound waves being carried in the exhaust system or intake system, but have a phase shift of 180° relative to these. Even if sound waves, which are being carried in the exhaust system or intake system and can be attributed to the operation of the internal combustion engine, and the sound waves generated by the loudspeaker correspond to each other in terms of frequency and have a phase shift of 180° relative to each other, but the sound waves do not correspond to each other in terms of the amplitude, there will only be an attenuation of the noise emitted from the exhaust system or intake system.

An exhaust system with a system for actively influencing sound being carried in the exhaust system from the state of the art will be described below with reference to FIGS. 1 and 2.

An exhaust system 4 with a system 7 for actively influencing sound being carried in the exhaust system 4 has a sound generator 3 in the form of a sound-insulated housing, which contains a loudspeaker 2 and is connected to the exhaust system 4 in the area of a tail pipe 1 via a sound line. The tail pipe 1 has an orifice 8, which releases exhaust gas being carried in the exhaust system 4 and airborne sound being carried in the exhaust system 4 to the outside. An error microphone 5 is provided at the tail pipe 1. The error microphone 5 measures sound in the interior of the tail pipe 1. This measurement by means of the error microphone 5 takes place in a section located downstream of an area in which the sound line opens into the exhaust system 4 and the fluidic connection is thus established between the exhaust system 4 and the sound generator 3. The term "downstream" is related here to the direction of flow of the exhaust gas in the tail pipe 1 of the exhaust system 4. The direction of flow of the exhaust gas is indicated by arrows in FIG. 2. Additional components of the exhaust system 4, for example, a catalytic converter and a muffler, may be provided (not shown) between the area of the fluidic connection between the exhaust system 4 and the sound generator 3 and the internal combustion engine 6. The loudspeaker 2 and the error microphone 5 are connected each to a control 9. Further, the control 9 is connected to an engine control 6' of an internal combustion engine 6 via a CAN bus. The internal combustion engine 6 further has an intake system 6". Based on sound measured by the error microphone 5 and operating parameters of the internal combustion engine 6, which are received via the CAN bus, the control 9 calculates for the loudspeaker 2 a signal, which generates a desired overall noise when superimposed to the sound being carried in the interior of the tail pipe 1 of the exhaust system 4, and emits this at the loudspeaker 2. The control may use, for example, a filtered-x least mean squares (FxLMS) algorithm and attempt to control a feedback signal/error signal measured by means of the error microphone to zero by outputting sound via the loudspeaker (in case of sound cancellation) or to control a predefined threshold value (in case of sound influencing). Another bus system may also be used instead of a CAN bus.

The mode of operation of the control will be explained in more detail below with reference to FIGS. 3 through 5 based on the example of an active noise cancellation (ANC) control.

Many noises, which are generated by machines, for example, internal combustion engines, compressors or propellers, have periodic components. By monitoring the machine in question with a suitable sensor (e.g., tachometer), this makes it possible to provide a time-dependent input wave vector x(n), which has a dependence on the basic frequency and the harmonics of the noise predominantly by the machine. For example, the exhaust gas back pressure, the mass flow of the exhaust gas, the temperature of the exhaust gas, etc., may be involved in this dependence. Many machines generate noises of different basic frequencies; these are often called engine harmonics.

This time-dependent input wave vector x(n) has, as is shown in FIG. 3, an influence on the signal generated by the noise source according to an unknown z-transformed transfer function of the noise source P(z) (the signal corresponding to generated noise to be superimposed), d(n), and is used by the control algorithm of a system for actively influencing sound (called "ANC core" in FIGS. 3, 4A, 4B and 6A) for generating a sound, which corresponds to a sound corresponding to a signal u(n) used for the superimposition, which sound leads to a desired noise corresponding to the feedback signal e(n) when superimposed with the sound corresponding to the signal d(n) to be superimposed. The signal u(n) used for the superimposition corresponds (within the operating range) to the sound pressure of a sound generator, which generates the sound to be superimposed to the sound pressure of a sound generator. The transfer function of the source Pz can be determined empirically.

The superimposition is symbolized in FIG. 3 by the summation sign Σ and takes place in the acoustic area (e.g., in an exhaust gas line). The feedback signal e(n) arising from the superimposition is detected, for example, by means of an error microphone and returned to the control algorithm (ANC core) as a feedback signal.

$$e(n)=d(n)-u(n).$$

The feedback signal e(n) thus corresponds to a sound pressure of the superimposed noise.

In FIG. 3, P(z) is the Z-transform of the transfer function of the noise source. This transfer function P(z) may depend, besides on the basic variable of the machine generating the noise (in this case a time-dependent input wave vector x(n) representing the speed of rotation), on numerous physical parameters, for example, pressure, mass flow rate and temperature of the sound-carrying system. The transfer function of the noise source P(z) is not, as a rule, known exactly and is often determined empirically.

It is known that the model of the ANC control shown in FIG. 3 has shortcomings, because the feedback signal e(n), which is returned to the control algorithm and is obtained from the superimposition of the signal d(n) to be superimposed, which is generated by the noise source on the basis of the transfer function of the noise source P(z), to the sound generated by the sound generator corresponding to the signal u(n) used for the superimposition, contains components that cannot be attributed to the transfer function P(z) of the noise source.

The model of the ANC control is subsequently expanded by a transfer function of the sound generator S(z), as is shown in FIGS. 4A and 4B.

This transfer function of the sound generator S(z) takes into account, on the one hand, shortcomings of the digital-analog (D/A) converters, filters, amplifiers, sound generators, etc., used in the electrical field, but also of the path from the site of the sound generation/sound superimposition to the site of an error microphone determining the feedback signal e(n), which path is not yet taken into account in the acoustic area by the transfer function of the noise source P(z), and, finally, shortcomings of the error microphone, preamplifier, anti-aliasing filter and analog-digital (A/D) converter, etc., adjoining this in the electrical area.

In expanding the model from FIG. 3, the signal y(n) outputted by the ANC core therefore takes into account in the model according to FIGS. 4A and 4B the transfer function of the sound generator S(z), which is involved in the conversion of the signal y(n) outputted by the ANC core into the signal u(n). The signal u(n) used for the superimposition corresponds in this case to the (mathematically idealized) amplitude of the signal generated by the sound generator.

The transfer function of the sound generator, S(z), takes into account the entire area from the output of the control to the feedback signal of the control.

When noises are generated by the noise source (i.e., the noise source is switched on), the transfer function of the sound generator S(z) is obtained as $$S(z)=u(z)/y(z)$$

and the signal u(n) used for the superimposition corresponds to the convolution of the signals s(n) and y(n)

$$u(n)=\text{conv}[s(n), y(n)],$$

wherein s(n) is the pulse response of the transfer function of the sound generator S(z). e(z), y(z) and u(z) are the respective Z-transforms of the signals e(n), y(n) and u(n).

FIG. 4B shows the model from FIG. 4A in more detail. As can be seen, the signal y(n) outputted by the ANC core is composed of two sinusoidal oscillations $\sin(\omega_0 n)$, $\cos(\omega_0 n)$, which are provided by a sine wave generator, are shifted by 90° relative to one another and are amplified before by different gain factors $w_1(n)$, $w_2(n)$ by means of two amplifiers in order to generate two signals $y_1(n)$, $y_2(n)$ shifted by 90° relative to one another with different amplitudes. The gain of the two amplifiers is correspondingly adapted dynamically by an adaptation circuit as a function of the feedback signal e(n).

If, for example, the ith engine harmonic $EO_i$ shall be cancelled for a certain speed of rotation RPM of the internal combustion engine, the basic frequency $f_0$ to be cancelled is obtained as $$f_0 = EO_i \cdot RPM/60,$$

$$\omega_0 = 2\pi f_0.$$

The adaptation circuit used to adapt the gain in FIG. 4B is operated with a clock frequency that sets the clock frequency of the ANC core.

FIG. 5 schematically shows the spectral profile of the amplitude (Magn) of the noise (noise(n)) over the frequency (Freq). The signal d(n) to be superimposed indicates here the current sound pressure at the given basic frequency $f_0$ in Pascals. ‖d(f)‖ shows the value of the amplitude at a defined time for harmonics.

The input wave vector x(n) of the ANC control is defined now as follows (vectors are printed in bold):

$$x(n)=[\sin(\omega_0 n), \cos(\omega_0 n)].$$

It was demonstrated in the paper "*Active Noise Control: A tutorial review*" by Sen M. Kuo and Dennis R. Morgan, published in the *Proceedings of the IEEE*, Vol. 87, No. 6, June 1999, that the ANC control minimizes the feedback signal e(n) after a build-up time. Reference is made to this paper in full extent and especially in respect to the narrowband feedforward control described there (the paper "*Active Noise Control: A tutorial review*" by Sen M. Kuo and Dennis R. Morgan, published in the *Proceedings of the IEEE*, Vol. 87, No. 6, June 1999 is incorporated by reference herein in its entirety).

$$y(n)=x(n)w^T(n)=w(n)x^T(n)=w_1(n)\sin(\omega_0 n)+w_2(n)\cos(\omega_0 n).$$

Here, $x^T(n)$ designates the transpose of the input wave vector x(n), i.e., the vector at which the columns and rows are transposed.

The vector $w(n)=[w_1(n), w_2(n)]$ formed from the gain factors is called the phase vector of the ANC control here.

As is shown in FIG. 4B, the gain of the sine waves is adapted by adaptation by means of the phasor vector w(n).

$$w(n+1)=w(n)+\mu \cdot \text{conv}[s(n), x(n)]e(n),$$

wherein $\mu$ indicates the rate of adaptation.

Since the transfer function of the sound generator S(z) is not known to the ANC core for each time, an estimate $\hat{S}(z)$ is used, instead, so that the adaptation becomes $$w(n+1)=w(n)+\mu \cdot \text{conv}[\hat{s}(n), x(n)]e(n),$$

wherein $\hat{s}(n)$ is the pulse response of $\hat{S}(z)$. The estimate of the transfer function $\hat{S}(z)$ of the sound generator is formed in the known manner. A comparison is made between the signal output from the sound generator with the signal input to the sound generator. Any difference is caused by the manipulation performed to the signal by the sound generator. This manipulation is termed the transfer function of the sound generator S(z). However, the true transfer function is difficult to obtain for complex systems. Therefore, the invention allows for the use of an estimate of the transfer function which essentially compares the signal output from the sound generator (20) with the signal input to the sound generator for multiple operating conditions to form what is termed the estimate of the transfer function $\hat{S}(z)$ and could also be termed an optimal or best available transfer function. This includes among other things the effect of a digital-to-analog (D/A) converter, reconstruction filter, power amplifier, loudspeaker, acoustic path from loudspeaker to error microphone, error microphone, preamplifier, antialiasing filter, and analog-to-digital (A/D) converter.

It was demonstrated in the state of the art that under the assumption that
a) the signal d(n) to be superimposed is a simple wave; and
b) the actuator to be used can provide an amplitude
$\|u(n)\| \geq \|d(n)\|$,
it is possible to markedly reduce the average (AVG) of the feedback signal e(n): $\text{AVG}[e(n)_{FINAL}] \sim 0$.

It is emphasized that the above explanations are only examples, and the present invention also includes other known possibilities for generating the signal y(n) outputted by the ANC core.

It is disadvantageous in prior-art systems for actively influencing sound that attempts are made, as a rule, to extensively or fully cancel a noise generated by the noise source. This leads to an extensively high load on an actuator being used, which is thus available for further influencing the sound (in the sense of a sound design) to a very limited extent only.

SUMMARY OF THE INVENTION

Therefore, an object of the present invention is to provide a system and a method for actively influencing sound, which provides a higher degree of freedom in influencing the sound and preferably releases reserves of an actuator being used.

Embodiments of a system for actively influencing sound have a sound generator, an error sensor (e.g., error microphone), a signal generator (ANC core), a controller, a first weighter, an adder and a second weighter. The sound generator is configured to generate sound when an audio signal is sent to it and to superimpose the generated sound to a sound that is to be manipulated. The sound to be manipulated may be, according to one embodiment, a sound generated by an internal combustion engine, which is being carried in an exhaust system or intake system of a vehicle operated by an internal combustion engine. The error sensor (which may also be, for example, a pressure sensor) is configured to measure superimposed sound, which is obtained from the superimposition of the sound generated by the sound generator to the sound to be manipulated, and to output a corresponding feedback signal. The sound signal, on which the audio signal used by the sound generator is based, is generated and outputted by the signal generator. The controller (which may be a component separate from the signal generator or which may be integrated in the signal generator) is configured to generate a control signal. The control signal represents (or is) a value of a sequence of rational numbers. The term "sequence of rational numbers" shall express the fact that the control signal is not a constant, but new values for the control signal are outputted by the controller time and time again over the course of time. The control signal is thus dynamic. The range of rational numbers comprises the range lower than zero, the value zero, the range greater than zero to one and the range greater than one. The control signal may be a value from above ranges alone. The sound signal outputted by the signal generator is z-transformed by the first weighter, convoluted (i.e., folded) with an estimate of the z-transform of the transfer function of the sound generator ($\hat{S}(z)$) and multiplied by the control signal outputted by the controller. The resulting signal is multiplied by the first weighter by "−1" and thus inverted. The sound signal transformed, convoluted, weighted and inverted in this manner is outputted to the adder. The adder receives, in addition, the feedback signal generated by the error sensor. The weighted and inverted sound signal is added by the adder to the feedback signal, and the modified feedback signal thus obtained is outputted to the signal generator. The signal generator uses the modified feedback signal to generate the sound signal. The sound signal thus depends (among others) on the modified feedback signal. The second weighter multiplies the sound signal outputted by the signal generator by the difference from one and with the control signal generated by the controller and outputs the sound signal thus weighted to generate the audio signal for the sound generator.

Thus, the consequence of the use of the control signal is that, on the one hand, a weighted sound signal, which does not deliberately lead to a full cancellation of the sound to be manipulated, is outputted to the sound generator, and, on the other hand, the feedback signal of the weighting of the sound signal is also modified correspondingly, so that the signal generator (ANC core) generates the sound signal such that it takes the modified feedback signal into account. Since the control signal may also assume a value greater than one, even an amplification of the sound to be manipulated may occur. However, the control signal is not constant over time, but is a sequence of numbers. It is possible in this way to use different control signals as a function of the sound to be manipulated or as a function of different operating states. These control signals make it possible to lower or raise the sound to be manipulated by a factor that depends on the control signal. For example, an increase by a certain factor may be desired in case of a low sound pressure of the sound to be manipulated, and a reduction by a certain value may be desired in case of a high sound pressure of the sound to be manipulated. It should be emphasized that the sound signal, which is generated by the signal generator, is likewise not constant, but depends especially on the modified feedback signal and hence indirectly also on the sound to be manipulated. However, the extent of the increase or decrease of the sound to be manipulated depends essentially on the control signal.

According to one embodiment, the controller generates the control signal as a function of an input wave vector, which depends on a state of a source of the sound to be manipulated and is thus directly or indirectly related to the sound to be manipulated. The control signal can thus be a function of the input wave vector.

According to one embodiment, the controller updates the control signal at fixed time intervals and consequently cyclically.

According to one embodiment, the input wave vector is representative of at least one parameter of an engine, namely, the speed of rotation or engine load, which represents the noise source; the position of the accelerator or a gradient of the accelerator (change in the position of the accelerator per unit of time), the accelerator controlling the noise source; a state of a clutch or of a transmission, which are connected to the noise source; a mode of operation of the noise source (e.g., "sport" or "economy" in case of an internal combustion engine of a vehicle); a voltage of a battery connected to the noise source; and an operating state of the noise source (e.g., preparations are made for starting the noise source (in case of an internal combustion engine: Ignition is turned on), noise source is started, noise source is running)

According to one embodiment, the system may further have a microphone, which measures the sound to be manipulated and outputs a measured signal corresponding to this. The sound to be manipulated may be, for example, a sound being carried in an exhaust system of a vehicle operated by means of an internal combustion engine; the microphone may now be arranged at or in the exhaust system at a point—relative to a flow direction of the exhaust gas being carried in the exhaust system—that is located upstream of the site at which a sound being carried in the exhaust system is superimposed to sound generated by the sound generator. The controller is configured now to generate the control signal as a function of the measured signal, which is outputted by the microphone. The input wave vector of the controller is now the measured signal of the microphone. The dependence of the input wave vector on the sound to be manipulated may now lie in the fact that the input wave vector is obtained by measuring the sound to be manipulated.

According to one embodiment, the control signal is not calculated on the basis of a current input wave vector, but on the basis of an input wave vector preceding it in time. The time lag depends on the internal clock frequency of the signal generator and is preferably selected to be as small as possible in order to keep an error as low as possible. According to one embodiment, the time lag equals a single clock frequency or 2 to 50 times the clock frequency. According to one embodiment, the chronologically preceding input wave vector occurred less than one second ago and more preferably less than half a second ago and even more preferably less than one fourth of a second ago.

If the input wave vector used to generate the control signal by the controller is not exactly the same vector as that used to generate the sound signal by the signal generator, but an input wave vector slightly preceding it in time, the system becomes more robust and less prone to buildup.

As an alternative or in addition, the system may have, in addition, according to one embodiment, a user interface, which is configured to receive a user input. The controller is now configured to generate the control signal as a function of the user input, which is received via the user interface. The dependence of the input wave vector on the sound to be manipulated is thus established in this case indirectly by a corresponding user input. The user interface may be, for example, a keyboard or also an accelerator, whose position or gradient (change per unit of time) is detected.

As an alternative or in addition, the controller can be connected to an engine control of an engine and configured to generate the control signal as a function of signals that are received from the engine control. The dependence of the input wave vector on the sound to be manipulated is established in this case via signals outputted by the engine control.

As an alternative or in addition, the controller is configured to generate the control signal as a function of speed sensor signals of an engine.

According to one embodiment, the signal generator is further configured to receive an input wave vector, which depends on the sound to be manipulated (and is thus directly or indirectly related to the sound to be manipulated), and to generate the sound signal as a function of the input wave vector.

According to one embodiment, the system may now also have a microphone, which measures the sound to be manipulated and outputs a measured signal corresponding to this. The sound to be manipulated may be, for example, a sound being carried in an exhaust system of a vehicle operated by means of an internal combustion engine; the microphone may be arranged now on or in the exhaust system at a site that is located—relative to the flow direction of the exhaust gas being carried in the exhaust system—upstream of the site at which sound being carried in the exhaust system is superimposed to sound generated by the sound generator. The signal generator is configured now to generate the sound signal as a function of the measured signal that is outputted by the microphone. As an alternative or in addition, the signal generator may be able to be connected to an engine control and/or to a speed sensor of an engine and configured to generate the sound signal as a function of signals that are received from the engine control and/or speed sensor.

According to one embodiment, the sound signal is not calculated by the signal generator on the basis of a current (measured) signal, but on the basis of a (measured) signal preceding it in time. The time lag depends on the clock frequency of the signal generator and is preferably selected to be as small as possible in order to keep an error as small as possible. According to one embodiment, the space in time is a single clock frequency or 2 to 50 times the clock frequency of the signal generator. The preceding measured signal preferably occurred less than a second ago and more preferably less than half a second ago and even more preferably less than one fourth of one second ago.

According to one embodiment, the sound generator is a loudspeaker, which is arranged in a suitable housing, and may optionally have a sound conductor. According to one embodiment, the sound generator is connected to the exhaust system of a vehicle operated by means of an internal combustion engine via a T-piece or via a Y-piece.

According to one embodiment, the error sensor is arranged on or in an exhaust system of a vehicle operated by means of an internal combustion engine at a site that is located—relative to the flow direction of the exhaust gas in the exhaust system—downstream of the site at which sound being carried in the exhaust system is superimposed to sound generated by the sound generator.

According to one embodiment, the controller calculates the control signal on the basis of a mathematical formula from the input wave vector. According to an alternative embodiment, a table, in which control signals suitable for different input wave vectors or input wave vector ranges are stored, is stored in the controller. The controller is configured in this case to read a control signal belonging to a particular input wave vector from the table and to output it. The control signals belonging to the input wave vectors may be determined, for example, empirically. Such a table is also called "data input."

According to one embodiment, the signal generator has a sine wave generator, which generates a first signal, whose time curve follows the sine function, and which generates a second signal, which is shifted by 90° against the first signal; a first amplifier for amplifying the first signal; a second amplifier for amplifying the second signal, and a heterodyne oscillator, in which the first and second signals amplified by the first and second amplifiers are superimposed, and is configured to output the signal superimposed by the heterodyne oscillator as a sound signal. Further, the generator has an adaptation circuit, which controls the gain of the first and second amplifiers as a function of the modified feedback signal. According to one embodiment, the adaptation circuit is configured to be connected to an engine control of an internal combustion engine and/or to the error sensor in case the system is used in a vehicle operated by means of an internal combustion engine, and to also select the gain of the first and second amplifiers as a function of input wave vectors, which are received from the engine control. In case of a vehicle operated by means of an internal combustion engine, these input wave vectors may be, according to one embodiment, one or more velocities of the vehicle, one or more speeds of rotation of the internal combustion engine, one or more torques of the internal combustion engine, one or more temperatures of exhaust gas being carried in an exhaust system, one or more mass flows of the exhaust gas being carried in the exhaust system or of air taken into an intake system.

According to one embodiment, the sine wave generator may be configured, in case the system is used in a vehicle operated by means of an internal combustion engine, to be connected to an engine control of an internal combustion engine and to select the frequency of the first and second signals as a function of input wave vectors, which are received from the engine control. According to one embodiment, these input wave vectors may be based on one or more velocities of the vehicle, one or more speeds of rotation of the internal combustion engine or one or more torques of the internal combustion engine, one or more temperatures of exhaust gas being carried in an exhaust system and one or more mass flows of the exhaust gas being carried in the exhaust system or of air taken into an intake system.

According to one embodiment, the sine wave generator may be connected to the adaptation circuit and configured to select the frequency of the first and second signals as a function of signals that are received from the adaptation circuit. It can be avoided hereby that even though the sound generated on the basis of the sound signal and the sound to be manipulated agree, they have a phase shift not equaling 180° in relation to one another.

According to one embodiment, the generator uses a narrowband feedforward control to generate the sound signal, taking the feedback signal into account.

According to one embodiment, the first weighter is configured to use a sound signal outputted by the signal generator earlier instead of the sound signal outputted by the signal generator at a current time. According to one embodiment, the earlier times of the signal outputted by the signal generator may precede the sound signal outputted by the signal generator at a current time by one internal clock frequency or by a multiple of an internal clock frequency of the signal generator.

Embodiments of a motor vehicle have an internal combustion engine with an engine control and/or with a speed sensor as well as the above-described control. The engine control and/or the speed sensor is connected now to at least one of the signal generator and the controller and is configured to determine a speed of rotation and/or an engine load and/or a torque of the internal combustion engine to output it as an input wave vector at the generator and/or the controller.

Embodiments of a method for actively influencing sound have the following steps:

Generation of a sound signal;

Measurement of a superimposed sound, which is obtained from the superimposition of sound generated as a function of the signal (for example, by means of a sound generator) with sound to be manipulated (for example, sound being carried in an exhaust system of a vehicle operated by means of an internal combustion engine), in order to obtain a corresponding feedback signal; Generation of a control signal, wherein the control signal represents a value of a sequence of rational numbers;

z-Transformation of the sound signal, convolution of the transformed signal with an estimate of the z-transform of the transfer function of the sound generator ($\hat{S}(z)$) and weighting of the signal obtained with the control signal and inversion of the weighted signal thus obtained;

Adding of the signal thus weighted and inverted to the feedback signal in order to obtain a modified feedback signal, the sound signal being generated with the use of the modified feedback signal in the step of generating the sound signal;

Weighting of the sound signal with the difference from one and with the control signal in order to obtain a weighted sound signal; and Use of the weighted sound signal to generate the sound generated as a function of the signal. As noted above, the estimate of the transfer function $\hat{S}(z)$ of the sound generator is formed in the known manner. A comparison is made between the signal output from the sound generator with the signal input to the sound generator. Any difference is caused by the manipulation performed to the signal by the sound generator. The invention compares the signal output from the sound generator (20) with the signal input to the sound generator for multiple operating conditions to form what is termed the estimate of the transfer function $\hat{S}(z)$ and could also be termed an optimal or best available transfer function. This includes among other things the effect of a digital-to-analog (D/A) converter, reconstruction filter, power amplifier, loudspeaker, acoustic path from loudspeaker to error microphone, error microphone, preamplifier, antialiasing filter, and analog-to-digital (A/D) converter.

According to one embodiment, the control signal can then be generated in the step of generating the control signal with the use of an input wave vector, which depends directly or indirectly on the sound to be manipulated.

According to one embodiment, the method further comprises a measurement of the sound to be manipulated in order to obtain a measured signal corresponding to this, wherein the control signal is generated with the use of the measured signal in the step of generating the control signal.

According to one embodiment, the method further comprises the reception of a user input, wherein the control signal is generated as a function of the user input in the step of generating the control signal.

According to one embodiment, the control signal depends on at least one of a speed of rotation or engine load of the engine, on an accelerator position or on an accelerator gradient, on a state of a clutch or of a transmission, on a mode of operation of the engine, on a voltage of a battery and on an operating state of the internal combustion engine.

According to one embodiment, a sound signal corresponding to an earlier time is used instead of a sound signal corresponding to a current time in the step of convoluting the z-transform of the signal with an estimate of the transform of the transfer function of the sound generator and of weighting the signal obtained with the control signal and inversion of the weighted signal thus obtained.

It is noted in this connection that the terms "comprise," "have," "involve," "contain" and "with," as well as their grammatical variations, which are used in this description and in the claims for listing features. should generally be considered to be an incomplete listing of features, e.g., method steps, devices, ranges, variables and the like, and do not rule out in any way the presence of other or additional features or groups of other or additional features.

Further features of the present invention appear from the following description of exemplary embodiments in conjunction with the claims as well as with the figures. Identical or similar elements are designated by the same or similar reference numbers in the figures. It is noted that the present invention is not limited to the exemplary embodiments described, but is defined by the scope of the attached patent claims. In particular, the individual features may be embodied in embodiments according to the present invention in a different number and combination than in the examples mentioned below.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
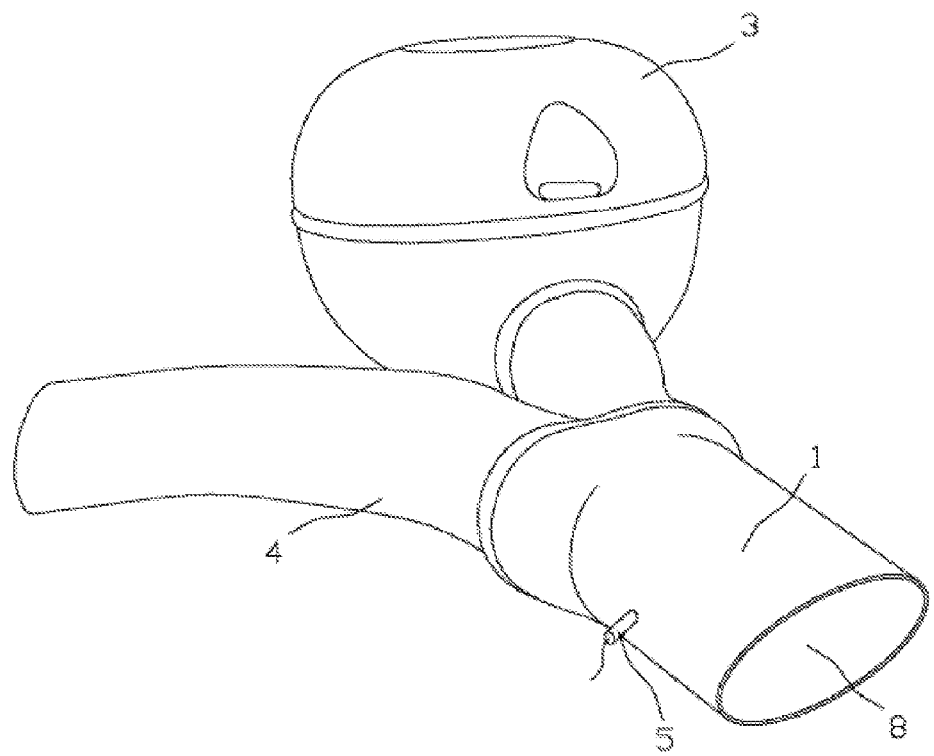
FIG. 1 is a perspective view of a system for actively influencing sound being carried in the exhaust system according to the state of the art.
Figure 2:
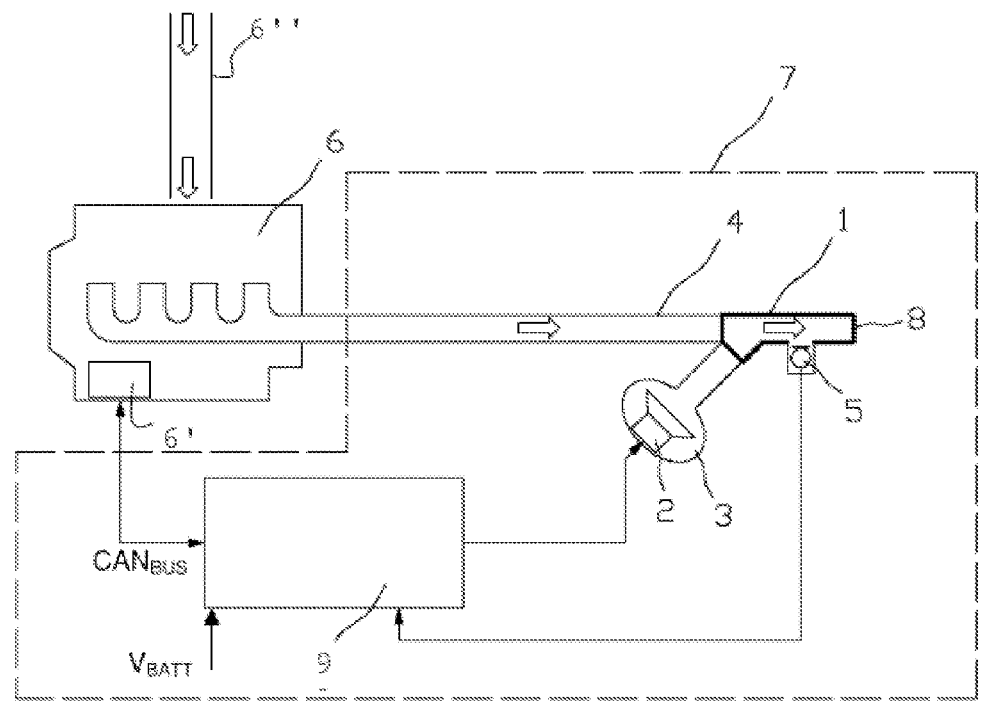
FIG. 2 is a schematic view showing a block diagram of the system for actively influencing sound being carried in the exhaust system according to FIG. 1.
Figure 3:
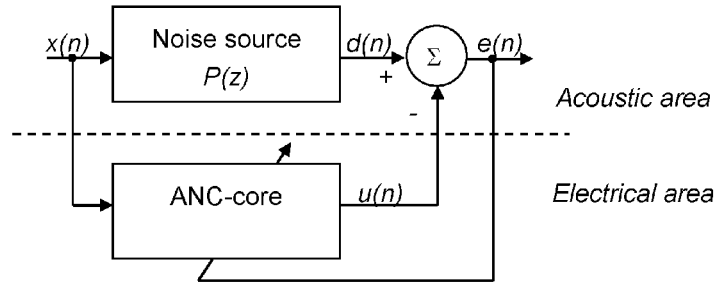
FIG. 3 is a schematic view showing a signal flow chart of a system for actively influencing sound according to the state of the art.

Referring to the drawings, a preferred embodiment of the present invention will be explained below with reference to the figures.

Figure 7:
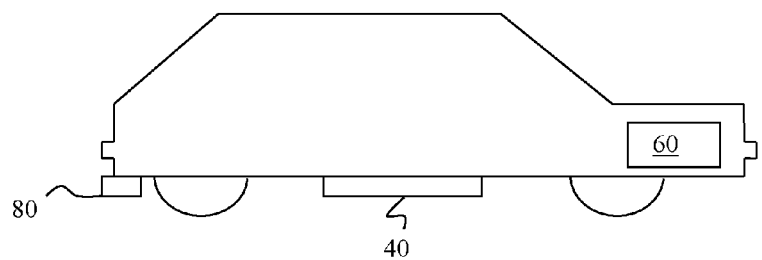
FIG. 7 is a schematic view showing a vehicle operated by means of an internal combustion engine with the system from FIGS. 6A, 6B.

A motor vehicle schematically shown in FIG. 7 has an internal combustion engine 60 and an exhaust system 40, via which exhaust gases and sound generated in the internal combustion engine 60 during the operation are carried to a tail pipe 80. The exhaust gases are cleaned in the exhaust system 40 and the sound is muffled before the exhaust gases and the sound are released into the surrounding area via the tail pipe 80.

Figure 6A:
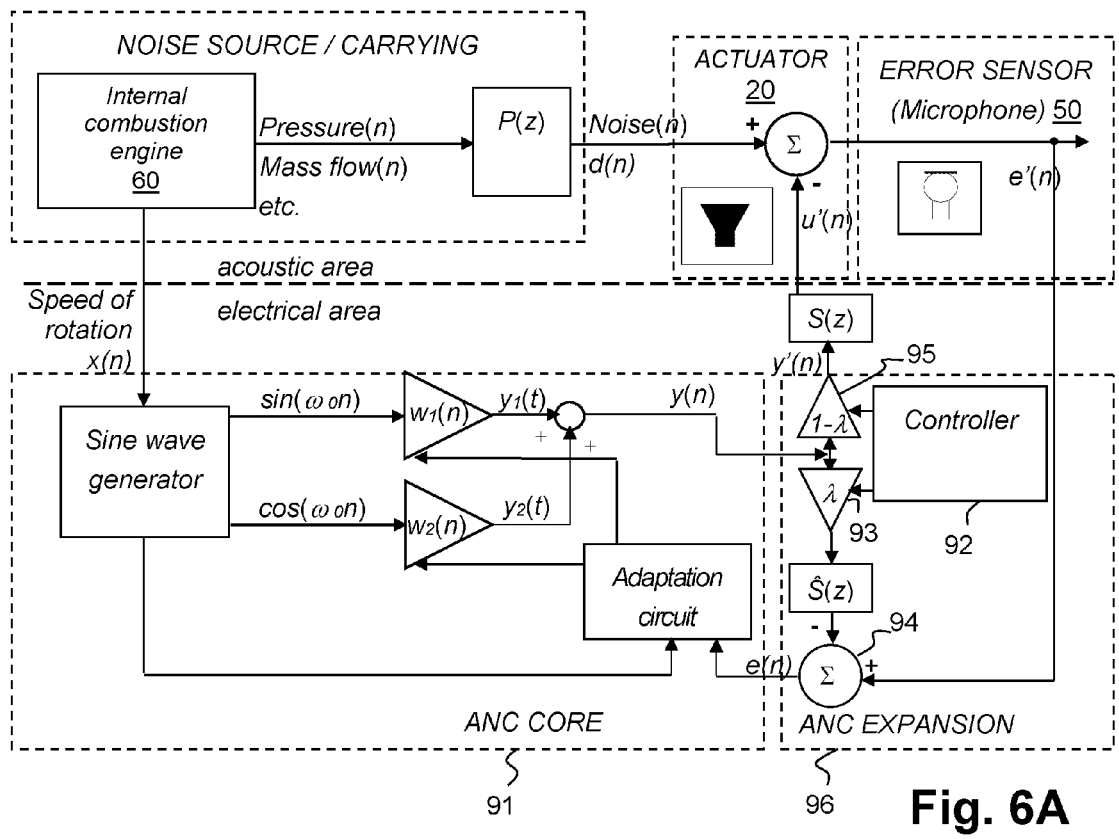
FIG. 6A is a schematic view showing a signal flow chart showing a degree of detail for a system for actively influencing sound according to an embodiment of the present invention.
Figure 6B:
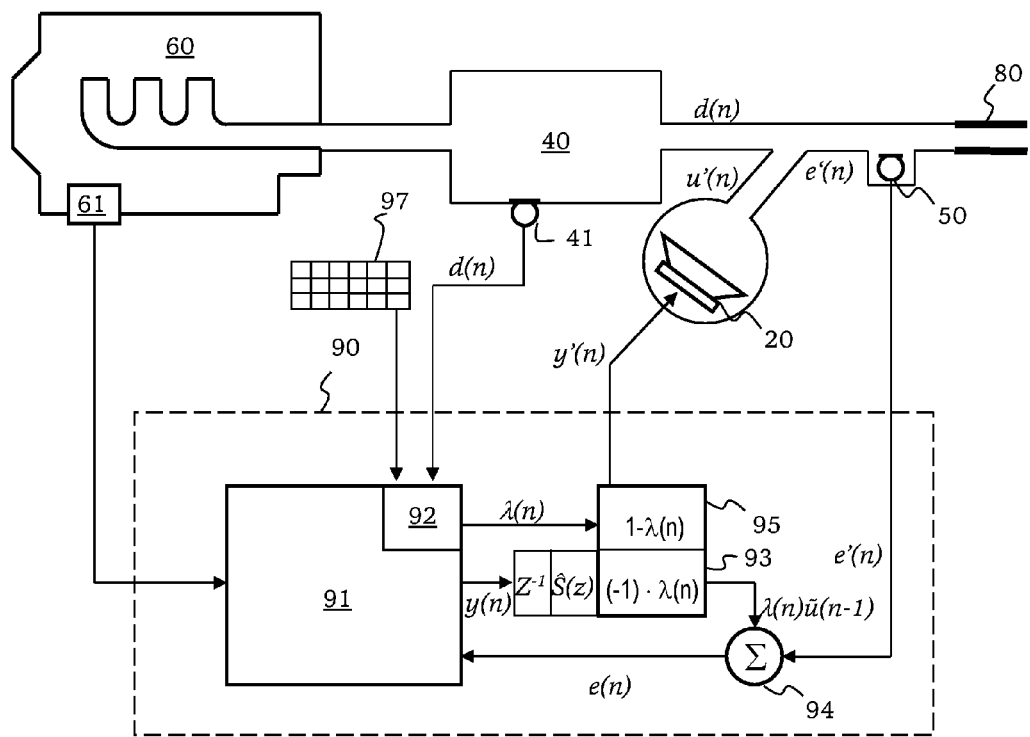
FIG. 6B is a schematic view showing a signal flow chart showing a further degree of detail for a system for actively influencing sound according to an embodiment of the present invention.

In FIGS. 6A and 6B, which schematically show signal flow charts showing various degrees of detail for a system for actively influencing sound according to one embodiment of the present invention, the noises generated in the internal combustion engine 60 and carried in the exhaust system 40 correspond to a signal d(n) to be superimposed. The dependence of n shall express the fact that the noises generated by the internal combustion engine 60 depend on the operating state of the internal combustion engine 60 (for example, the speed of rotation and/or the torque of the internal combustion engine 60) and are thus subject to change over time. Since the flow charts according to FIGS. 6A and 6B are very similar, they will be discussed below together and only differences will be dealt with specifically.

The noises being carried in the exhaust system 40 are received by a microphone 41 arranged in the exhaust system 40. The microphone 41 outputs a corresponding measured signal, which corresponds to the signal d(n) to be superimposed.

Relative to the flow direction of the exhaust gas in the exhaust system 40, a sound generator 20 (actuator) with a loudspeaker is coupled with the exhaust system 40 downstream of the microphone 41 via a Y-line. A weighted sound signal y'(n) is sent to the loudspeaker and the loudspeaker generates (taking the transfer function of the sound generator S(z) and corresponding components into account) a sound, which corresponds to a weighted signal u'(n) used for the superimposition, which signal superimposes the noises carried in the exhaust system 40.

If the signals d(n) to be superimposed, which correspond to the noises being carried in the exhaust system 40, have a phase shift of 90° in relation to the weighted signal u'(n) of the sound generated by the loudspeaker, which weighted signal is used for the superimposition, and if the signals d(n) and u'(n) also correspond to one another in terms of their amplitude (i.e., d(n)=−u'(n)), full cancellation of the noises being carried in the exhaust system 40 will occur.

The sound outputted via the tail pipe 80 is measured via an error sensor 50, which is configured as an error microphone and which is arranged, relative to the flow direction of the exhaust gas in the exhaust system 40, downstream of the site of superimposition of the noises being carried in the exhaust system 40 with the sound generated by the loudspeaker, and a corresponding unmodified feedback signal e'(n) is outputted.

The weighted sound signal y'(n), with which the loudspeaker is operated, is provided by a active noise control system 90, which comprises a signal generator/ANC core 91 and an ANC expansion 96.

Figure 4A:
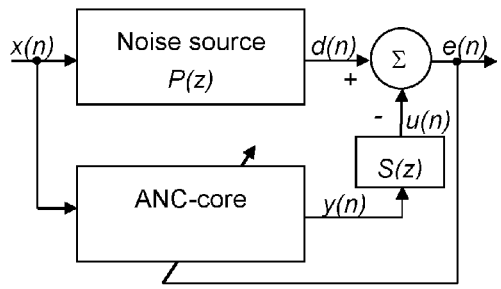
FIG. 4A is a schematic view showing a signal flow chart showing a degree of detail for a system for actively influencing sound according to the state of the art.
Figure 4B:
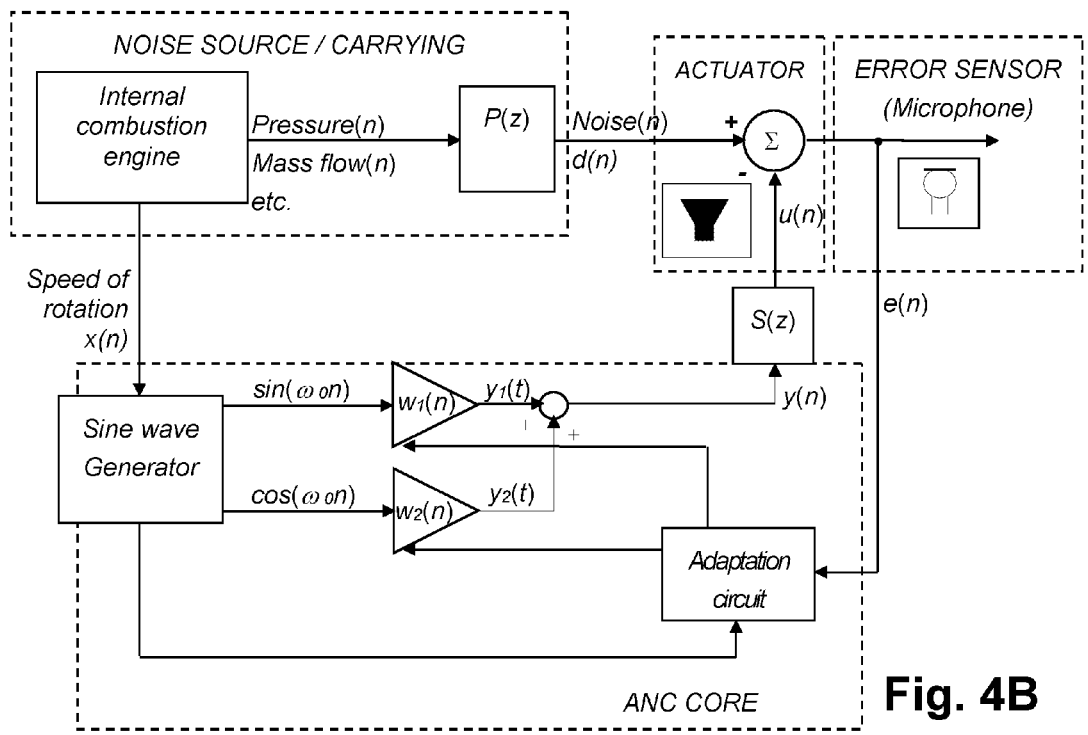
FIG. 4B is a schematic view showing a signal flow chart showing various a further degree of detail for a system for actively influencing sound according to the state of the art.
Figure 5:
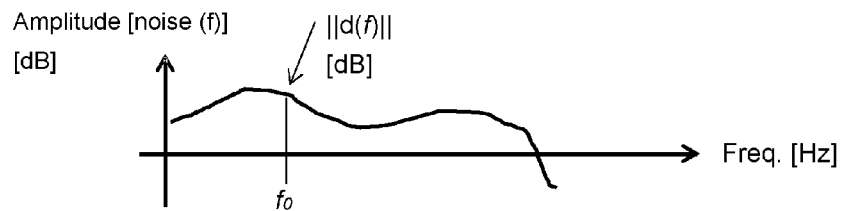
FIG. 5 is a schematic view showing the amplitude curve of a noise to be manipulated.

The signal generator/ANC core 91 has a sine wave generator, first and second amplifiers and an adaptation circuit. Reference is made to the explanations given for FIG. 4B.

The ANC expansion 96 has a controller 92, first and second weighters (which are embodied by amplifiers with adjustable gain) 93, 95, and an adder 94.

In the embodiment shown in FIG. 6B, the signal generator/ANC core 91 with the controller 92 is embodied by a first microprocessor, the first and second weighters 93, 95 by a second microprocessor and the adder 94 by a third microprocessor. These components may also be integrated, as an alternative, in a single microprocessor. In another alternative, the controller 92 may also be embodied by a separate microprocessor, as it is shown in FIG. 6A.

The signal generator/ANC core 91 and the controller 92 are connected to an engine control 61 of the internal combustion engine 60 and receive an input wave vector x(n), which indicates a current speed of rotation and a current torque of the internal combustion engine 60, from the engine control 61. Further, the signal generator/ANC core 91 and the controller 92 receive, in the embodiment according to FIG. 6B (but not in FIG. 6A), the measured signal d(n) of the microphone 41 and, via a user interface 97, an input of a user. In the embodiment being shown, the user interface 97 is a keyboard, via which a user can enter whether the vehicle shall output less or more sound. However, the present invention is not limited to such a user interface. The input wave vector x(n) is usually 1XN-dimensional matrix of values (a single column vector). Active noise cancellation has the problem that it may not be fast enough to cancel the exhaust sound by simply measuring the actual exhaust sound and generating a suitable anti-noise signal. As such the input wave vector x(n) comprises multiple values that may be input to the controller 92 for forming a control signal λ(n). The input wave vector x(n), including plural values, is formed by measuring the system (including the internal combustion engine 60, exhaust duct/exhaust system 40, etc.) at various operating conditions (temperatures, torques, rpm . . . ). Based on the measurements the input wave vector x(n) is formed. The input wave vector x(n) may be dynamic, e.g. the vector is changed in dependency on the additional microphone 41 or a user input 97 (for sport mode—silent mode). The input wave vector x(n) is representative of at least one parameter of an engine, in particular namely, the speed of rotation or engine load, which represents the noise source; the position of the accelerator or a gradient of the accelerator (change in the position of the accelerator per unit of time), the accelerator controlling the noise source; a state of a clutch or of a transmission, which are connected to the noise source; a mode of operation of the noise source (e.g., "sport" or "economy" in case of an internal combustion engine of a vehicle); a voltage of a battery connected to the noise source; and an operating state of the noise source (e.g., preparations are made for starting the noise source (in case of an internal combustion engine: Ignition is turned on, noise source is started, noise source is running)). For example, given:

an engine rotation speed RPM and
$EO_i$=desired engine noise order to be cancelled or modified or reduced
the frequency $f_{o}$, where the noise shall be influenced/modified/reduced, is calculated—for example for 4 stroke engines—by the formula $$f_0 = EO_i * RPM/60$$

The related pulsation, as widely known, is given by $$\omega_0 = 2\pi f_0$$

The input wave vector x(n) calculated at the sample time n can be so defined:

$$x(n) = [\sin(\omega_0 n), \cos(\omega_0 n)]$$

As an example, the input wave vector (which is referred to as "reference input vector" in the essay "Active Noise Control: A tutorial review" of Sen M. Kuo and Dennis R. Morgan, published in Proceedings of the IEEE, Vol. 87, No. 6, June 1999), is a harmonic function of the rotational speed of an internal combustion engine. According to an embodiment of the present invention, the control signal λ(n) is a function of u(n). u(n) is a function of y(n). y(n) is a function of x(n). Thus, the control signal λ(n) indirectly is a function of x(n).

Based on the received speed of rotation, the torque and the measured signal d(n), the signal generator/ANC core 91 generates, in the known manner (for example, with the use of an FxLMS algorithm), a sound level y(n), which would be suitable for cancelling the signal d(n) to be superimposed, which corresponds to the sound being carried in the exhaust system 40, if the loudspeaker were operated with the sound signal y(n). The signal generator/ANC core 91 now takes into account the transfer function S(z) of the sound generator 20. There are several methods to determine the best available the transfer function Ŝ(z), for example by using one of the system identification methods indicated in the book "Identification of Dynamic Systems" Isermann and Munchhof, Springer , ISBN 978-3-540-78878-2.

Further, the controller 92 generates a control signal λ(n) as a function of the received speed of rotation, the received torque, the received measured signal d(n) (in the variant according to FIG. 6B only) and the received user input. Concretely, control signals λ(n) determined empirically in advance for a particular speed of rotation, torque, measured signal and user input for the motor vehicle are stored in the controller 92 in this embodiment, so that the controller 92 only needs to select the control signal λ(n) suitable for the particular operating state. The stored control signals λ(n) are each rational numbers. Therefore, a sequence of control signals λ(n), which represent a sequence of rational numbers, is outputted by the controller 92 over the course of time.

The signal generator/ANC core 91 outputs the sound signal y(n) and the controller 92 the control signal λ(n) to the first and second weighters 93, 95.

The first weighter 93 weights the sound signal y(n) with the control signal λ(n) and inverts the weighted signal in order to obtain a weighted and inverted signal λ(n)ũ(n−1) taking an estimate $\hat{S}(z)$ of the transfer function S(z) ($\hat{S}(z)$ is also referred to as a best available transfer function) of the sound generator 20 into account. Here, ũ(n−1) designates a signal generated at an earlier time for the purpose of superimposition. The weighted and inverted sound signal λ(n)ũ(n−1) outputted by the first weighter 93 is added by the adder 94 to the unmodified feedback signal e'(n), which is received from the error sensor 50, in order to obtain a modified feedback signal e(n).

The signal generator/ANC core 91 receives the modified feedback signal e(n) and takes it into account when generating the sound signal y(n), which is suitable for cancelling the sound d(n) being carried in the exhaust system 40 when the loudspeaker is operated with the sound signal y(n).

The second weighter 95 weights the sound signal y(n) with 1-λ(n) and outputs the sound signal y'(n) thus weighted to the loudspeaker of the sound generator 20. The loudspeaker is thus operated with the weighted sound signal y'(n). Taking the transfer function S(z) of the sound generator 20 into account, sound, which corresponds to a weighted signal u'(n) used for the superimposition, is superimposed to sound being carried in the exhaust system, which corresponds to the signal d(n) to be superimposed.

The difference between u(n) and ũ(n) expresses in the present application the fact that u(n) is formed based on the real transfer function S(z) of the generator 20, and ũ(n) is formed based on the estimate $\hat{S}(z)$ of the transfer function of the sound generator 20. $\hat{S}(z)$, u(n) and ũ(n) correspond to each other in case of a good estimate of the transfer function of the sound generator.

Since the sound signal y(n) originally generated by the signal generator/ANC core 91 was weighted before with a value, the weighted sound signal y'(n) is no longer able to fully cancel the sound being carried in the exhaust system 40 if the loudspeaker is operated with the sound signal y'(n). The sound being carried in the exhaust system is rather canceled to a certain percentage only, which percentage depends on the control signal λ(n).

The algorithm implemented now in the signal generator/ANC core 91, the controller 92, the first weighter 93 and the second weighter 95 is thus based on the following considerations:

The signal d(n) to be superimposed, which corresponds to the sound to be canceled, which is being carried in the exhaust system 40, can be represented for an input wave vector x(n) corresponding to a certain engine harmonic and speed of rotation (and consequently a basic frequency $f_0$) as a basically harmonic signal with phase and amplitude variable over time $$d(n)=D(n)\sin(\omega_0 n+\varphi_d(n)) \quad \omega_0=2\pi f_0$$

in which "n" indicates the time curve (and is a time index of a time-discrete series). $\omega_d(n)$ is called "system phase" and only depends on the noise source.

The sound outputted for cancelling/superimposing by the loudspeaker must correspondingly likewise correspond to a harmonic signal u(n) with a phase and amplitude variable over time:

$$u(n)=U(n)\sin(\omega_0 n+\varphi_u(n)).$$

Here, D(n) and $\varphi_d$(n) are not known at first. However, the following approximation is permissible as soon as the ANC control converges:

$$\varphi_u(n)\approx\varphi_d(n) \text{ (u(n) and d(n) are in phase).}$$

Therefore, u(n) can be rewritten as:

$$u(n)=U(n)\sin(\omega_0 n+\varphi_d(n)).$$

After superimposition of the signal d(n) to be superimposed, which corresponds to the sound being carried in the exhaust system 40, to the signal u(n) used for superimposition, which corresponds to the sound outputted by the loudspeaker, the residual sound is obtained at the tail pipe (80) for the frequency $f_0$ as a feedback signal e(n) as:

$$e(n)=d(n)-u(n).$$

Consequently, e(n) is likewise a linear combination of harmonic signals and can therefore likewise be expressed as a function of the "system phase" $\varphi_d$(n):

$$e(n)=E(n)\sin(\omega_0 n+\varphi_d(n)).$$

The amplitude E(n) shall now be controlled with the system and method according to the present invention.

In case of successful noise cancellation, e(n) converges towards zero after some time, so that $$e(n)=d(n)-(u(n)\Rightarrow 0\approx d(n)-u(n)$$

is true in case of successful noise cancellation.

This formula can be rewritten as:

$$e(n)=d(\text{n})-\lambda u(n)+\lambda u(n)-u(n)\approx 0$$

and further as $$d(n)-(1-\lambda)-u(n)-\lambda u(n)\approx 0.$$

Here, λ is a real number of the sequence of numbers λ(n). Just like the sequence of numbers λ(n), the above formula can be calculated for each time n. Consequently, it is possible to generally use a time-variant variable λ(n) instead of a concrete value λ, for a concrete time n.

The following new variables e'(n), u'(n) and y'(n), which are also used in FIGS. 6A and 6B above, are introduced:

$$e'(n)=d(n)-(1-\lambda)u(n)\Rightarrow e(n)=e'(n)-\lambda u(n)\approx 0$$

(the value e(n) converges towards zero)

$$u'(n)=(1-\lambda)u(n)=(1-\lambda)\text{conv}[s(n), y(n)]=\text{conv}[s(n), (1-\lambda)y(n)]$$

(wherein conv designates the convolution of two time series)

$$y'(n)=(1-\lambda)y(n).$$

As was stated already, no full noise cancellation but only a settable attenuation shall be sought to be achieved by means of the system and method according to the present invention. The desired (unmodified) feedback signal after the superimposition (FINAL) is therefore obtained as $$e'_{FINAL}(n)\approx\lambda u(n).$$

At the same time, $$e'(n)=d(n)-(1-\lambda)u(n)\approx d(n)-(1-\lambda)d(n)$$

is true in case of full noise cancellation, and $$e'(n)\approx\lambda d(n)$$

is obtained from this.
Hence follows $$e'_{FINAL}(n)\approx\lambda d(n).$$

The (unmodified) feedback signal measured by the error sensor 50 corresponds to a factor, which is multiplied by the signal to be superimposed, which signal corresponds to sound being carried in the exhaust system when the system and method for influencing sound is not used.

An analysis of the variable λ(n) has shown that the variable λ(n) depends on the sound to be manipulated d(n) and is therefore directly or indirectly related to the sound to be manipulated. This dependence is manifested in the system being shown, which is used together with the exhaust system of a vehicle operated by means of an internal combustion engine, in the following parameters (params): The speed of rotation or engine load of the engine; the position of the accelerator or the gradient of the accelerator, wherein the accelerator controls the engine; the state of a clutch or a transmission, which are connected to the engine; a mode of operation of the engine; a voltage of a battery connected to the engine, and an operating state of the internal combustion engine.

Another function, Ξ(params), which depends on the above-mentioned dependences (parameters), can therefore be introduced to represent the variable λ(n).

$$\lambda(n)=\Xi(params).$$

The value of the variable λ can therefore be calculated for each time n from a real function Ξ(params). As is apparent from a rearrangement of this formula, the feedback signal of the sound remaining for a basic frequency $f_0$ after the superimposition (with a certain tolerance range) is equal to the product of the sound at the same frequency by a freely settable coefficient λ.

In respect to the variable u'(n), this means:

$$u'(n)=(1-\lambda)u(n)=(1-\lambda)\text{conv}[s(n), y(n)]=\text{conv}[s(n), 1-\lambda)y(n)],$$

from which $$y'(n)=(1-\lambda)y(n)$$

is obtained.

In respect to e'(n), the problem of an algebraic loop is obtained from $$e(n)=e'(n)-\lambda u(n),$$

because u(n) itself depends, in turn, on e(n). This problem can be circumvented by using chronologically slightly preceding values of u(n) (these chronologically preceding values are called "n−1"). The time lag should be selected to be as small as possible:

$$e(n)=e'(n-1)\lambda u(n-1)=e'(n)-\lambda \text{ conv}[s(n\lambda 1), y(n-1)].$$

s(n−1) is not known. It is, however, possible empirically to determine the pulse response §(n) of the estimate of the transfer function of the sound generator (z) for the components used for the sound generation.

In case of a sufficiently short time lag, $$s(n-1)\approx \hat{s}(n).$$

so that $$e(n)\approx e'(n)-\lambda \text{ conv}[\hat{s}(n), y(n-1)]$$

is obtained from $$e(n)=e'(n)-\lambda \text{ conv}[s(n-1), y(n-1]$$

The values for λ(n) and Ξ(params) can be determined empirically and predefined by corresponding data input.

Figure 8:
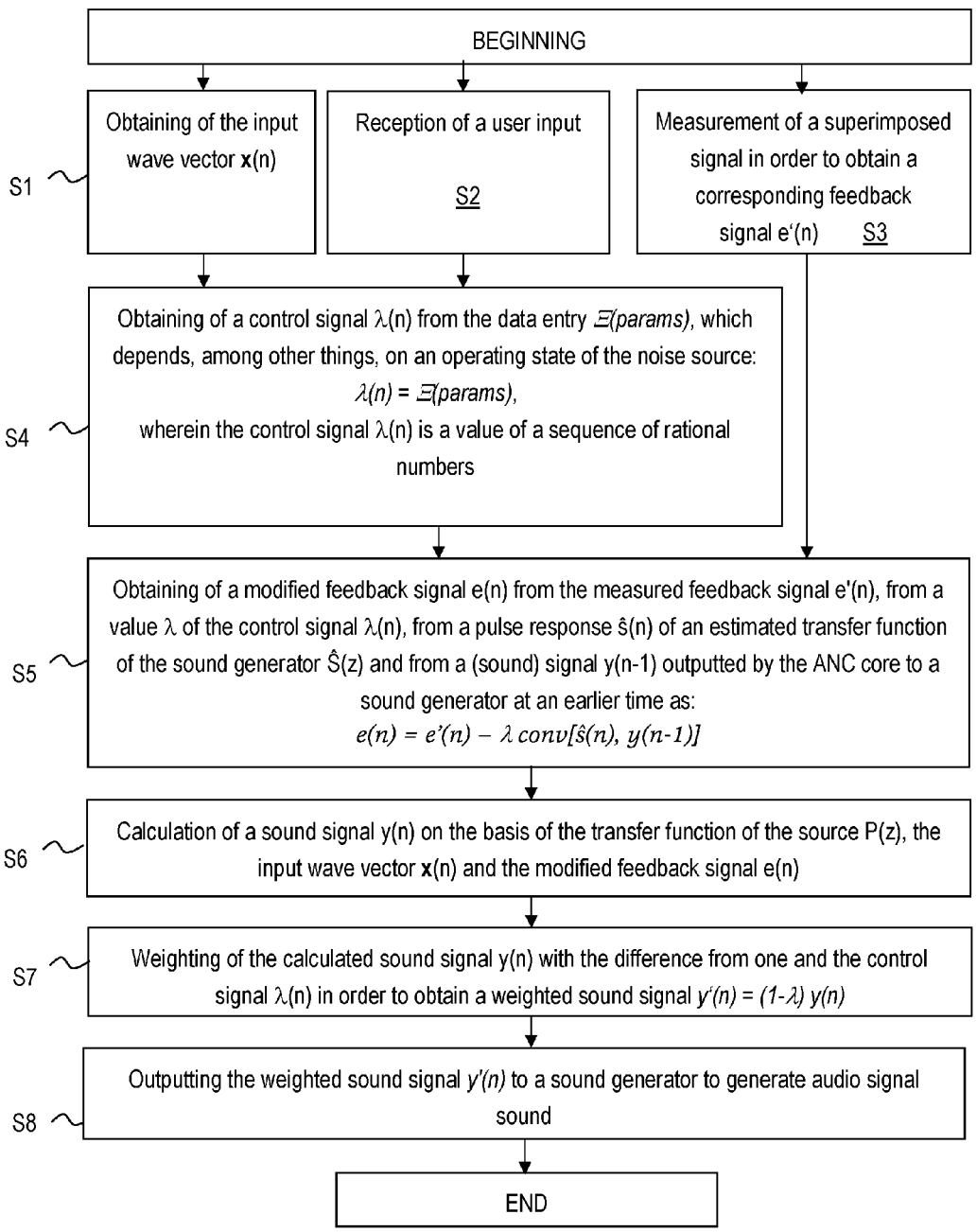
FIG. 8 is a flow chart of a method for actively influencing sound being carried in the exhaust system according to the present invention.

A method for operating the above-described system will be described below with reference to FIG. 8.

An input wave vector x(n) is first generated in step S1. This takes into account sound to be manipulated, which was measured by means of the microphone 41, and data received from the engine control 61.

A user input is received (step S2) via the user interface 97 simultaneously with this. The superimposed sound is measured in step S3 simultaneously with this and a corresponding feedback signal e'(n) is outputted.

Using a variable λ(n), which is obtained from the data input and depends on an operating state of the noise source, a control signal λ(n), which represents a value of a sequence of rational numbers, is generated by the controller 92 in step S4. This value may be greater or less than or equal to zero.

A modified feedback signal e(n) is obtained in step S5 according to the formula e(n)=e'(n)−λ conv[ŝ(n), y(n−1)] from the measured feedback signal e'(n), a value λ, of the control signal λ(n), a pulse response ŝ(n) of an estimated transfer function of the sound generator Ŝ(z) and a (sound) signal y(n−1) outputted by the ANC core 91 at an earlier time to a sound generator.

A sound signal y(n) is calculated in step S6 on the basis of the transfer function of the source P(z), of the input wave vector x(n) and of the modified feedback signal e(n). This calculated sound signal y(n) is weighted in step S7 by the second weighter 95 with the difference from one and the value λ of the λ(n) in order to obtain a weighted sound signal y'(n) (y'(n)=(1−λ) y(n)).

The weighted sound signal y'(n) is outputted in step S7 to the sound generator 20 to generate an audio signal.

The effect exerted by the system and method according to the present invention is shown in FIGS. 9a through 11B. The exhaust system of a vehicle operated by means of an internal combustion engine was correspondingly modified.

Figure 9A:
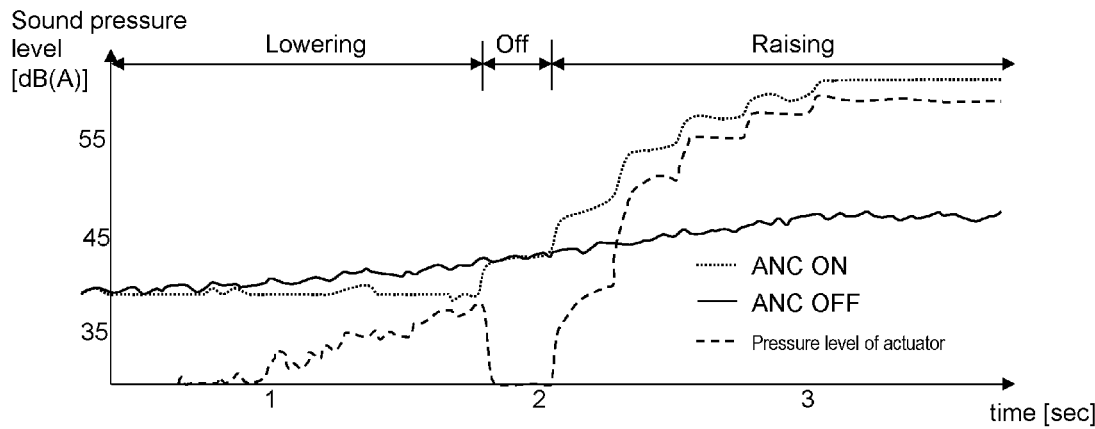
FIG. 9A is a schematic view showing the curve of a sound pressure level with the use of the system from FIGS. 6A, 6B.

As is seen in FIG. 9A, it is possible by means of the system according to the present invention to reduce the sound pressure level compared to the unmanipulated sound (ANC OFF) (for up to 1.75 sec), not to manipulate it (between about 1.75 sec and approx. 2.25 sec) or to raise it (beginning from about 2.25 sec). The controller 92 set up such that the control signal λ(n) was generated such that a distance of the sound pressure became greater with the ANC system activated (ANC ON) over time beginning from about 2.25 sec. This was achieved here by raising the speed of rotation of the engine continuously over time and using it to generate the λ(n). In addition, the pressure level obtained at the actuator (sound generator) is shown. The steps in the signal pattern of the pressure level and of the pressure level of the actuator can be attributed to the circumstance that the control signal λ(n) was calculated in the example from a speed of rotation-dependent variable Ξ(speed of rotation), which variable Ξ(speed of rotation) assumes different values for different speed of rotation ranges.

Figure 9B:
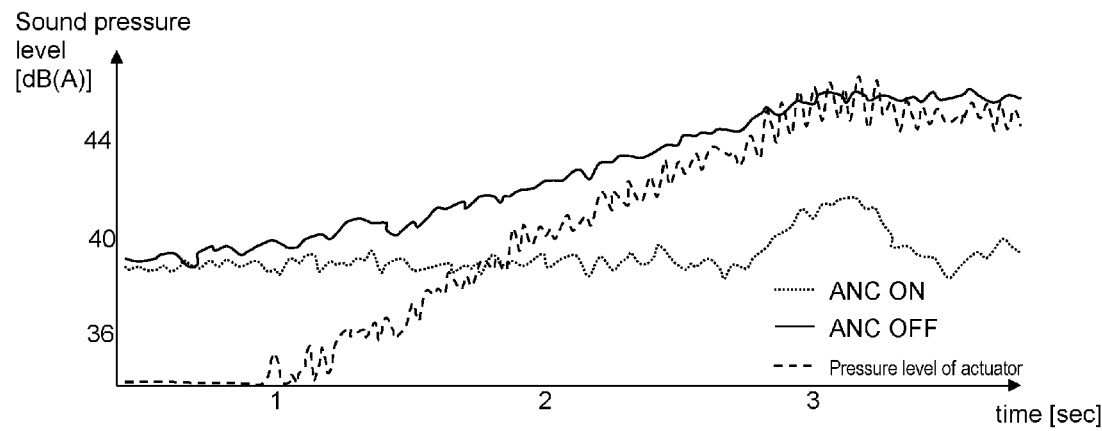
FIG. 9B is a schematic view showing the time curve of a sound pressure level without the use of the system from FIGS. 6A, 6B and hence according to the state of the art.

By contrast, FIG. 9B shows the sound pressure curve of a prior-art system. As is seen, attempts are continuously made in a conventional system (ANC ON) to lower the sound pressure level to a lowest possible value (here about 40 dB). The optional lowering and raising of the sound pressure level, which is possible in the system according to the present invention, is not possible in the prior art.

Figure 10:
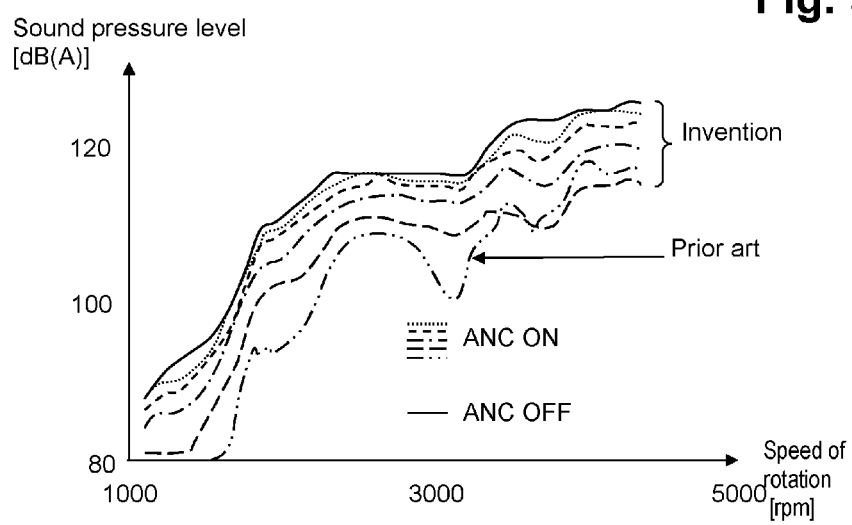
FIG. 10 is a schematic view showing the time curve of a sound pressure level with the use of the system from FIGS. 6A, 6B, wherein a time interval according to the state of the art is also faded in for purposes of comparison.

FIG. 10 shows different measurement results as they have become established with different data inputs in the system according to the present invention in the exhaust system of a diesel engine-powered vehicle. As is seen, the system according to the present invention makes it possible to lower the sound pressure level (broken lines show the sound pressure level with the use of the present invention) compared to the sound pressure level of the unmanipulated sound (black solid line) in the range between 1,000 revolutions per minute to about 4,500 revolutions per minute by a more or less constant value and to more or less follow the course of the sound pressure level of the unmanipulated sound. Since the course of the sound pressure level is more or less followed, the system according to the present invention for influencing sound has an especially natural sound. For comparison, the figure shows as the lowermost line the curve of the sound pressure level in the case of a prior-art system. As is seen, the deviation from the curve of the sound pressure level of the unmanipulated sound is subject here to variations.

Figure 11A:
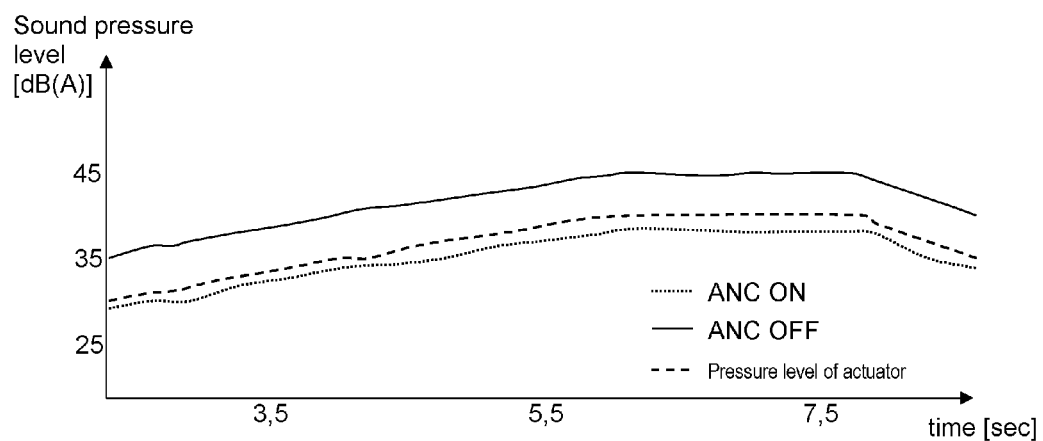
FIG. 11A is a time curve of a sound pressure level with the use of the system from FIGS. 6A, 6B, when passive measures are additionally taken for influencing the sound.
Figure 11B:
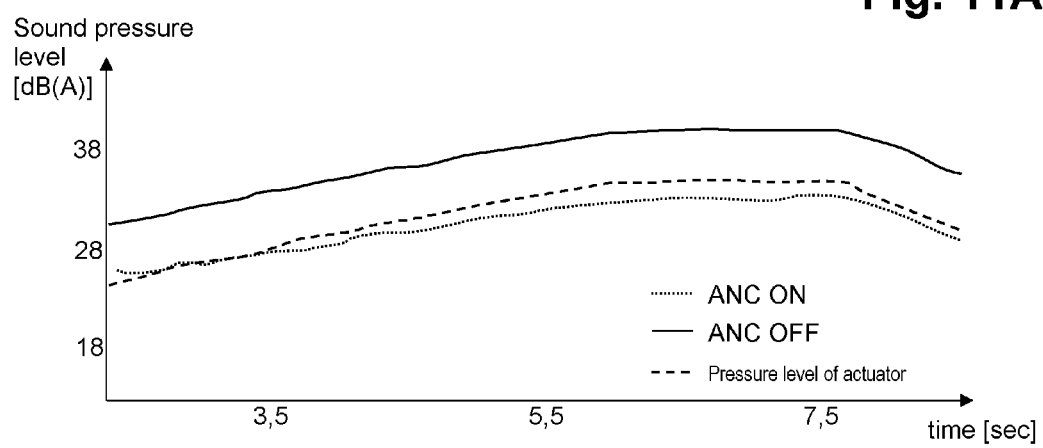
FIG. 11B is a time curve of a sound pressure level with the use of the system from FIGS. 6A, 6B, when passive measures are additionally taken for influencing the sound.

FIGS. 11A and 11B show how the use of the system according to the present invention can be demonstrated. The speed of rotation of an internal combustion engine used was first increased linearly over time from 1,000 revolutions per minute to 2,000 revolutions per minute, maintained at a constant value for some time, and then reduced again linearly. The sound pressure level for the third engine harmonic was measured.

FIG. 11A shows the curve of the sound pressure level with the system switched on and off as well as the pressure level of the actuator with system switched on. As can be seen, the system according to the present invention brings about a more or less constant muffling of the sound pressure level by about 7 dB.

In FIG. 11B, the exhaust system was muffled mechanically and thus made, on the whole, less loud by about 6 dB. As is seen, this mechanical muffling makes no change concerning the fact that the system according to the present invention brings about a more or less constant muffling of the sound pressure level by about 7 dB. At the same time, less energy is needed for the actuator. This effect does not occur in conventional systems.

The present invention can thus be demonstrated in vehicles operated by means of internal combustion engine with the following method:

The pressure level is measured first by means of an error microphone in the exhaust system downstream of the area of sound superimposition with the system switched off under controlled conditions (e.g., with a speed ramp from 800 to 4,500 revolutions per minute under constant load).

The sound pressure level is then measured with the error microphone under the same conditions with the system switched on. At the same time, the energization of the actuator (sound generator) is measured. Some stationary operating points of the measured curves obtained are selected.

The geometry of the passive exhaust system is now changed by mechanical measures such that the sound pressure level measured by means of the error microphone becomes lower or higher (by, e.g., about 3 dB).

The measurement is subsequently repeated for the stationary operating points with the system switched on. The measured signals are filtered specifically according to their engine harmonics.

If the present invention is used, the mechanical manipulation on the exhaust system should not lead to instability of the system for influencing sound. Further, the ratio of the sound pressure level measured with the error microphone with the system switched off to the sound pressure level measured with the error microphone with the system switched on should correspond in the mechanically manipulated system, taking certain tolerances into account, to the ratio of the sound pressure level measured with the error microphone with the system switched off to the sound pressure level measured with the error microphone with the system switched on in the mechanically unmanipulated system (for the stationary operating points). The difference between the sound pressure level measured with the error microphone with the system switched off and the sound pressure level measured with the error microphone with the system switched on should approximately correspond to the difference between the sound pressure level measured with the error microphone with the system switched off and the sound pressure level measured with the error microphone with the system switched on in the mechanically unmanipulated system (for the stationary operating points).

Even though the above exemplary embodiments of the present invention were only explained as examples, the persons skilled in the art will recognize that numerous modifications, additional and replacements are possible without deviating from the scope of protection and the essence of the invention disclosed in the following claims.

While specific embodiments of the invention have been shown and described in detail to illustrate the application of the principles of the invention, it will be understood that the invention may be embodied otherwise without departing from such principles.

APPENDIX 1:

LIST OF REFERENCE NUMBERS

1 Tail pipe
2 Loudspeaker
3 Sound generator
4 Exhaust system
5 Error microphone
6 Internal combustion engine
6' Engine control
6" Intake system
7 System for active noise cancellation
8 Orifice
9 Control
20 Sound generator/actuator
40 Exhaust system
41 Microphone
50 Error sensor
60 Internal combustion engine
80 Tail pipe
90 Active noise control system
91 Signal generator/ANC core
92 Controller
93 First weighter
94 Adder
95 Second weighter
96 ANC expansion
97 User interface
d(n) Signal to be superimposed, generated by the transfer function and measured by the microphone (corresponds to the noise generated by the source)
e(n) (Modified) feedback signal (corresponds to the pressure of the superimposed noise)
e'(n) Unmodified feedback signal
e(z) z-Transform of the signal e(n)
$EO_i$ ith engine harmonic
$f_0$ Basic frequency
P(z) z-Transform of the transfer function of the noise source (corresponds to the function on which the signal generation (and hence the sound generation) by the noise source is based)
u(n) Signal used for the superimposition (corresponds to the sound pressure of a sound generator, which generates the sound to be superimposed)
u'(n) Weighted signal used for the superimposition
u(n−1) Earlier signal used for the superimposition
u(z) z-Transform of the signal u(n)

S(z) z-Transform of the transfer function of the sound generator (corresponds to the conversion of the signal y(n) into the signal u(n))

s(n) Pulse response of the transfer function of the sound generator S(z)

$\hat{S}$(z) Estimate of the z-transform of the transfer function of the sound generator ŝ(n) Pulse response of the estimate of the transfer function of the sound generator $\hat{S}$(z)

w(n) Phasor vector/gain $w^T_{(n)}$ Transpose of the phase vector w(n)

$w_1$(n), $w_2$(n) Gain factors x(n) Input wave vector $x^T$(n) Transpose of the input wave vector x(n)

y(n) (Sound) signal outputted by the ANC core y'(n) Weighted (sound) signal outputted by the ANC core $y_1$(n), $y_2$(n) Signals outputted by the ANC core, shifted by 90° relative to one another y(z) z-Transform of the signal y(n)

μ Rate of adaptation

λ(n) Control signal

Ξ(params) Variable for representing ζ(n)

What is claimed is:

1. A system for actively influencing noise, the system comprising:
    a sound generator configured to generate sound when an audio signal is sent to the sound generator and to superimpose the sound generated by the sound generator to a sound to be manipulated;
    an error sensor configured to measure superimposed sound, which is obtained from the superimposition of the sound generated by the sound generator with the sound to be manipulated, and to output a corresponding feedback signal;
    a signal generator configured to generate and output a sound signal;
    a controller configured to generate a control signal, wherein the control signal represents a value of a sequence of rational numbers and the controller generates the control signal as a function of an input wave vector, which input wave vector depends on a state of the source of the sound to be manipulated;
    a first weighter, which receives the sound signal outputted by the signal generator and is configured to z-transform the sound signal outputted by the signal generator, convolute the z-transformed sound signal outputted by the signal generator with an estimate of the z-transform of a transfer function of the sound generator and configured to weight with the control signal generated by the controller and invert the z-transformed and convoluted sound signal to form a first weighter output or to weight the sound signal outputted by the signal generator with the control signal generated by the controller and invert the sound signal outputted by the signal generator, to z-transform the weighted and inverted sound signal outputted by the signal generator and to convolute the weighted and inverted and z-transformed sound signal outputted by the signal generator with an estimate of the z-transform of a transfer function of the sound generator to form a first weighter output;
    an adder configured to add the first weighter output to the feedback signal to form a modified feedback signal and to output the modified feedback signal to the signal generator; and
    a second weighter configured to weight the sound signal outputted by the signal generator with a difference from one and the control signal generated by the controller to form a weighted sound signal and to output the weighted sound signal to the sound generator as the audio signal wherein the signal generator generates the sound signal as a function of the modified feedback signal.

2. A system in accordance with claim 1, wherein the input wave vector comprises a matrix of values representing at least one of:
    speed of rotation or engine load or torque of an engine, which generates the sound to be manipulated;
    an accelerator position or an accelerator gradient, wherein the accelerator controls an engine, which generates the sound to be manipulated;
    a state of a clutch or a transmission, which are connected to an engine, which generates the sound to be manipulated,
    a mode of operation of an engine, which generates the sound to be manipulated,
    a voltage of a battery connected to an engine, which generates the sound to be manipulated, and
    an operating state of an engine, which generates the sound to be manipulated.

3. A system in accordance with claim 1, further comprising:
    a microphone, which measures the sound to be manipulated and outputs a measured signal corresponding to the sound to be manipulated, wherein the measured sound to be manipulated contributes to the input wave vector and the controller is configured to generate the control signal as a function of the measured signal, which is outputted by the microphone; and/or
    a user interface, which is configured to receive a user input, wherein the controller is configured to generate the control signal as a function of the user input, which is received via the user interface; and/or wherein
    the controller is connected to an engine control of an engine and is configured to generate the control signal as a function of signals that are received from the engine control, or wherein the controller is configured to generate the control signal as a function of speed of engine speed sensor signals of an engine.

4. A system in accordance with claim 1, wherein the signal generator is further configured to receive the input wave vector, which depends on the sound to be manipulated, and to generate the audio signal as a function of the input wave vector.

5. A system in accordance with claim 4, further comprising a microphone, which measures the sound to be manipulated and outputs a measured signal corresponding to the sound to be manipulated that contributes to the input wave vector and wherein the signal generator is configured to generate the sound signal as a function of the measured signal.

6. A system in accordance with claim 1, wherein the sound signal outputted by the signal generator used by the first weighter uses is outputted by the signal generator at an earlier time or earlier times than a current time.

7. A system in accordance with claim 6, wherein the earlier times of the signal outputted by the signal generator precede the sound signal outputted by the signal generator at a current time by a single internal clock frequency or a multiple of an internal clock frequency of the signal generator.

8. A motor vehicle comprising:
    an internal combustion engine with an engine control and/or with an engine speed sensor; and a system comprising:
  a sound generator configured to generate sound when an audio signal is sent to the sound generator and to superimpose the sound generated by the sound generator to a sound to be manipulated;
  an error sensor configured to measure superimposed sound, which is obtained from the superimposition of the sound generated by the sound generator with the sound to be manipulated and outputs a corresponding feedback signal;
  a signal generator configured to generate and output a sound signal;
  a controller configured to generate a control signal, wherein the control signal represents a value of a sequence of rational numbers;
  a first weighter, which receives the sound signal outputted by the signal generator and is configured to z-transform the sound signal outputted by the signal generator, convolute the z-transformed sound signal outputted by the signal generator with an estimate of the z-transform of a transfer function of the sound generator and configured to weight with the control signal generated by the controller and invert the z-transformed and convoluted sound signal to form a first weighter output or to weight the sound signal outputted by the signal generator with the control signal generated by the controller and invert the sound signal outputted by the signal generator, to z-transform the weighted and inverted sound signal outputted by the signal generator and to convolute the weighted and inverted and z-transformed sound signal outputted by the signal generator with an estimate of the z-transform of a transfer function of the sound generator to form a first weighter output;
  an adder configured to add the sound signal thus weighted and inverted to the feedback signal and to output a modified feedback signal obtained to the signal generator; and
  a second weighter configured to weight the sound signal outputted by the signal generator with a difference from one and with the control signal generated by the controller and to output a weighted sound signal to generate the audio signal, wherein the signal generator is configured to generate the sound signal as a function of the modified feedback signal, wherein the engine control and/or the engine speed sensor are connected to the signal generator and/or to the controller and are configured to determine a speed of rotation and/or an engine load and/or a torque of the internal combustion engine and, based on this, to output an input wave vector to the signal generator and/or to the controller, which input wave vector represents said speed of rotation and/or engine load and/or torque of the internal combustion engine.

9. A motor vehicle in accordance with claim 8, wherein the input wave vector comprises a matrix of values representing at least one of:
  speed of rotation or engine load or torque of an engine, which generates the sound to be manipulated;
  an accelerator position or an accelerator gradient, wherein the accelerator controls an engine, which generates the sound to be manipulated;
  a state of a clutch or a transmission, which are connected to an engine, which generates the sound to be manipulated,
  a mode of operation of an engine, which generates the sound to be manipulated,
  a voltage of a battery connected to an engine, which generates the sound to be manipulated, and
  an operating state of an engine, which generates the sound to be manipulated.

10. A motor vehicle in accordance with claim 8, further comprising:
  a microphone, which measures the sound to be manipulated and outputs a measured signal corresponding to the sound to be manipulated, wherein the measured sound to be manipulated contributes to the input wave vector and the controller is configured to generate the control signal as a function of the measured signal, which is outputted by the microphone; and/or
  a user interface, which is configured to receive a user input, wherein the controller is configured to generate the control signal as a function of the user input, which is received via the user interface; and/or wherein
  the controller is connected to an engine control of an engine and is configured to generate the control signal as a function of signals that are received from the engine control, or wherein the controller is configured to generate the control signal as a function of speed of engine speed sensor signals of an engine.

11. A motor vehicle in accordance with claim 8, wherein the signal generator is further configured to receive the input wave vector, which depends on the sound to be manipulated, and to generate the audio signal as a function of the input wave vector.

12. A motor vehicle in accordance with claim 11, further comprising a microphone, which measures the sound to be manipulated and outputs a measured signal corresponding to the sound to be manipulated that contributes to the input wave vector and wherein the signal generator is configured to generate the sound signal as a function of the measured signal.

13. A motor vehicle in accordance with claim 8, wherein the sound signal outputted by the signal generator used by the first weighter uses is outputted by the signal generator at an earlier time or earlier times than a current time.

14. A motor vehicle in accordance with claim 13, wherein the earlier times of the signal outputted by the signal generator precede the sound signal outputted by the signal generator at a current time by a single internal clock frequency or a multiple of an internal clock frequency of the signal generator.

15. A method for actively influencing sound, the method comprising the steps of:
  generating a sound signal;
  measuring a superimposed sound, which is obtained from the superimposition of sound generated as a function of the sound signal to sound to be manipulated in order to obtain a corresponding feedback signal;
  generating a control signal, wherein the control signal represents a value of a sequence of rational numbers with the use of an input wave vector, which input wave vector depends on the sound to be manipulated;
  convoluting the z-transform of the sound signal with an estimate of a z-transform of a transfer function of a sound generator and weighting this convolution of the z-transform of the sound signal with an estimate of a z-transform of a transfer function of a sound generator with the control signal and inversion of the weighted signal thus obtained or weighting and inverting the sound signal outputted by the signal generator z transforming the weighted and inverted signal and then convoluting the weighted and inverted and z-transformed sound signal outputted by the signal generator with an estimate of the z-transform of a transfer function of the sound generator;

adding of the signal weighted and inverted to the feedback signal in order to obtain a modified feedback signal, wherein the sound signal is generated in the step of generating the sound signal with the use of the modified feedback signal;

weighting of the sound signal with the difference from one and with the control signal in order to obtain a weighted sound signal; and with the weighted sound signal generating sound as a function of the sound signal.

16. A method in accordance with claim 15, further comprising:

measuring the sound to be manipulated in order to obtain a measured signal corresponding to the sound to be manipulated, wherein the control signal is generated in the step of generating the control signal with the use of the measured signal; and/or receiving of a user input, wherein the control signal is generated in the step of generating the control signal as a function of the user input.

17. A method in accordance with claim 15, wherein the control signal depends on at least one of a speed of rotation or engine load of the engine, an accelerator position or an accelerator gradient, a state of a clutch or a transmission, a mode of operation of the engine, a voltage of a battery and an operating state of the internal combustion engine wherein the output an input wave is based on at least one of a speed of rotation or engine load of the engine, an accelerator position or an accelerator gradient, a state of a clutch or a transmission, a mode of operation of the engine, a voltage of a battery and an operating state of the internal combustion engine.

18. A method in accordance with claim 15, wherein the sound signal outputted by the signal generator at an earlier time or earlier times than a current time is used for the step of convoluting the z-transform of the sound signal with an estimate of a z-transform of a transfer function of a sound generator and weighting this convolution of the z-transform of the sound signal with an estimate of a z-transform of a transfer function of a sound generator with the control signal and inversion of the weighted signal thus obtained or weighting and inverting the sound signal outputted by the signal generator z transforming the weighted and inverted signal and then convoluting the weighted and inverted and z-transformed sound signal outputted by the signal generator with an estimate of the z-transform of a transfer function of the sound generator.

* * * * *